United States Patent Office 3,763,188
Patented Oct. 2, 1973

3,763,188
SPIRO[1,1-POLYETHYLENEDI(OXYMETHYL)]-3-OXETANES
Carl G. Krespan, Wilmington, Del., assignor to E. I. du Pont de Nemours and Company, Wilmington, Del.
No Drawing. Filed Jan. 19, 1972, Ser. No. 218,000
Int. Cl. C07d 21/00
U.S. Cl. 260—338                8 Claims

ABSTRACT OF THE DISCLOSURE

Described are macrocyclic polyethers and thioethers having one or two spiro-oxetane rings. The compounds are prepared by reaction of 3,3-bis(chloromethyl)oxetane with polyethylene glycol or like compounds in which all or part of the oxygen is replaced with sulfur. The reaction is conducted in a suitable inert solvent. The compounds can be polymerized by opening of the oxetane ring with cationic initiators. The compounds and polymers can be employed to extract metals and particularly alkali or alkaline earth metal salts from water and are thus useful in various water-treatment procedures. Valuable heavy metals can also be extracted, particularly with the sulfur-containing compounds and their polymers.

T. W. Campbell, J. Org. Chem. 22, 1029 (1957) described ring opening polymerizations analogous to those of Farthing and additionally describes new condensation polymers of the type:

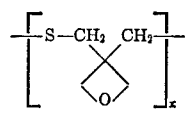

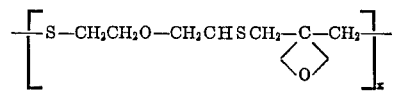

Both products were low molecular weight oils that were cross-linked on treatment with boron fluoride etherate.

A. W. Archer and P. A. Claret, Chem. & Ind. 1969, 1271, report the preparation of low yields of the following:

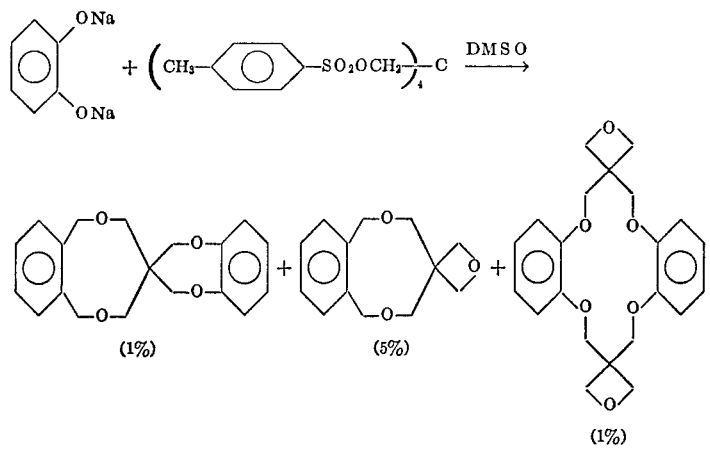

BACKGROUND OF THE INVENTION

This invention relates to novel macroheterocyclic compounds and polymers thereof which form strong complexes with alkali and alkaline earth metal salts.

Prior art

A. C. Farthing, J. Chem. Soc. 1955, 3648, describes the preparation of 3,3-disubstituted oxacyclobutanes (oxetanes by preferred nomenclature) and their polymerization as effected by electrophilic catalysts such as boron fluoride. The polymers described have the structure:

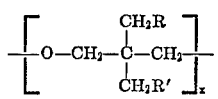

where R and R' are:

| R' | R |
|---|---|
| Cl | Cl |
| OAc | Cl |
| OAc | OAc |
| OH | OH |
| Me | Me |
| OEt | OEt |
| —Oφ | —Oφ |

C. J. Pedersen, J. Am. Chem. Soc. 89, 7017 (1967) has described cyclic polyethers known as crown compounds which are capable of complexing cations.

Summary of the invention

The monomeric compounds of the present invention have the formula:

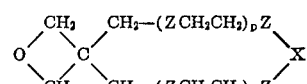

where each Z is oxygen or sulfur

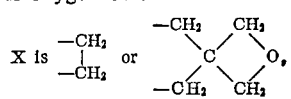

and where

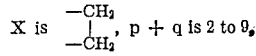

and where

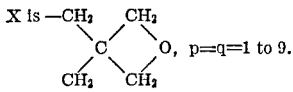

This invention also comprises polymers of the above monomers. In this case where only a single oxirane ring is present, i.e., in the above general formula where X is —CH$_2$CH$_2$—, the polymers have the formula

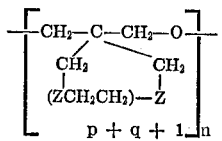

and are generally relatively low in molecular weight and soluble in various solvents. When at least a small portion of the spirooxetane is replaced with a dispirooxetane, crosslinked, swollen polymers of high molecular weight are produced having crosslinks of the formula:

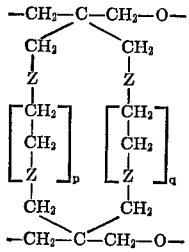

This invention also comprises complexes of the above monomers and polymers with salts of alkali and alkaline earth metals, and to a process for the extraction of said salts from aqueous solution by contacting the aqueous solution with an insoluble polymer of the invention.

Detailed description of the invention

The present invention provides new macrocyclic polyether and polythioether compounds which can be polymerized to polymers which retain the capacity for complexing alkali and alkaline earth metal compounds characteristic of the macrocyclic polyethers. Surprisingly, and in contrast to other known macrocyclic polyethers, the compounds of the present invention frequently complex more than one atom of alkali or alkaline earth metal salts per macrocyclic ring.

The preferred compounds of the present invention are those having the formula:

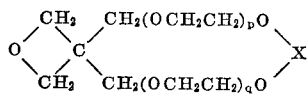

wherein the case of the spirocyclic compound X is —CH$_2$—CH$_2$— and $p+q$ is 2 to 9, and in the case of the dispirocyclic compounds $p=q=1$ to 9. These compounds can be prepared by the reaction of 3,3-bis(chloromethyl)oxetane with ethylene glycol or a polyethylene glycol which generically has the formula:

H(OCH$_2$CH$_2$)$_m$OH; $m=1$ to 10 in the presence of a base capable of converting the glycol to the alkoxide salt. The syntheses are carried out in a solvent that is stable to strong bases. Suitable solvents include t-butyl alcohol, t-amyl alcohol, 3-methyl-3-pentanol, α,α-dimethylpentanol, 1-methylcyclopentanol, 1-methylcyclohexanol, 3-methyl-3-heptanol, and close analogs thereof. Aprotic solvents such as dimethylformamide, dimethylacetamide, hexamethylphosphoramide, tetrahydrofuran, and tetramethylurea are also useful.

Conversion of the polyethylene glycols to the alkoxide salt requires the use of a strong base and, for this, it is generally found that potassium t-butoxide, sodium, potassium, and lithiummethyl are most satisfactory. The alkali metal hydrides are also effective in this application and, in particular, sodium hydride because of its ready availability. Alkali metal hydroxides are useful in the preparation of intermediate polyethylene glycols.

The synthesis of the spirooxetanes is generally effected at 80–160° C. and preferably at 70–120° C. for periods of time from a few hours to several days. The reaction mixtures should have moisture excluded and preferably oxygen is also excluded by operating in closed systems or inert atmospheres such as nitrogen, argon and helium.

The spiro and dispirooxetanes are generally formed as a mixture according to the reaction

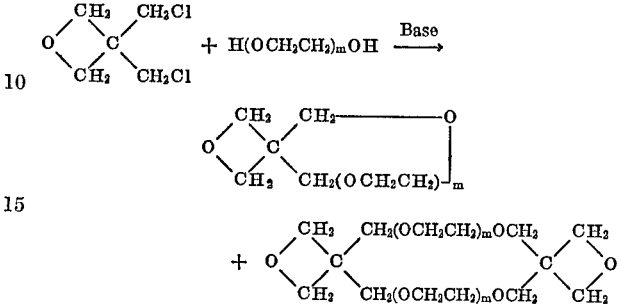

The proportions of the alternate products can be varied by appropriate changes in the concentration of the reactants.

Ethylene glycol and polyethylene glycol are well known and in the case of ethylene glycol di-, and triethylene glycols are available as articles of commerce. Higher polyethylene glycols can be synthesized as described in the examples. The 3,3-di(chloromethyl)oxetane can be made by the method described in Farthing, J. Chem. Soc. 1955, 3648.

The spiro- and dispirooxetanes are isolated from their reaction mixtures by standard procedures of filtration, distillation, crystallization and extraction. Extraction with the alkanes containing 5–9 carbon atoms is particularly useful in isolating the compounds of this invention.

In addition to the above preferred monomers, analogous macrocyclic compounds are readily made in which some or all of the ethyleneoxy (—CH$_2$CH$_2$—O—) units are replaced by ethylenethio (—CH$_2$CH$_2$S—) units, and are likewise useful complexing agents for metal salts, especially heavy metals.

The preparation of suitable sulfur-containing starting materials for making the macrocyclic polythioether compounds of this invention is described in the Textbook "Organic Chemistry of Bivalent Sulfur," E. E. Reid, Chemical Publishing Co., vol. I, pp. 394–5 and vol. II, pp. 217–220.

Syntheses of the spiro compounds of this invention that involve only mercaptide salts can be carried out under less stringent conditions, e.g., the etherifications can be run in the lower alkanols, such as methyl alcohol, ethyl alcohol, and the propyl alcohols, with or without water, and can employ sodium or potassium hydroxides as the base reagent. The temperatures for these reactions can be somewhat lower, e.g., from 60–150° C. Exclusion of oxygen or air is important.

Polymerizations

Polymerizations can be carried out in bulk or in dry solvents such as methylene chloride, ether, toluene or chloroform. Fairly potent cationic initiators are preferable, such as PF$_5$, BF$_3$, BF$_3$ etherate, triphenylmethylhexafluoroarsenate, trifluoromethanesulfonic acid, trifluoromethanesulfonic acid anhydride, triethyloxonium fluoroborate. Polymerization temperatures can range from —25 to +40° C., the preferred temperatures being —10 to 0° C. Molecular weights of soluble polymers from individual oxetanes are sometimes rather low, but the gel polymers and many copolymers have high molecular weights in the 3000–100,000 range. A trace of water appears to be necessary as a co-catalyst.

Utility

The monomeric macrocyclic compounds of the present invention and polymers thereof form complexes with a wide variety of metal salts, and in particular with the ions of alkali and alkaline earth metals. The complexes thus formed are sufficiently stable to be used to extract the inorganic compounds from water. The compositions of the present invention are thus useful in water treatment.

Specific embodiments of the invention

This invention is further illustrated by the following specific embodiments which should not, however, be construed as fully delineating the scope thereof.

In the embodiments, the representation OxEn is used to represent

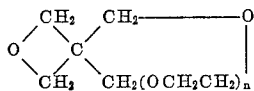

and the expression OxEnOxEn is used to represent

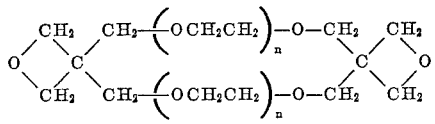

EXAMPLE 1

2,6,9,12,15 - pentaoxaspiro[3.12]hexadecane (abbreviated [Ox.E₃]) and 2,6,9,12,15,19,22,25,28,31-decaoxadispiro[3.12.3.12]dotriacontane 3 (abbreviated [Ox.E₃.OX.E₃])

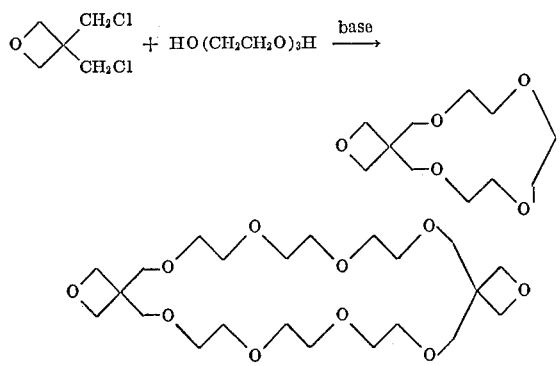

(A) Solutions of 15.0 g. (0.10 mol) of distilled triethylene glycol and 22.4 g. (0.20 mol) of potassium t-butoxide in 300 ml. of dry dimethylformamide and 15.5 g. (0.10 mol) of 3,3-di(chloromethyl)oxetane in 300 ml. of dry dimethylformamide were added dropwise to 400 ml. of dimethylformamide heated at 105° C. under $N_2$ and stirred vigorously. The simultaneous addition was complete in 2.5 hours, during which time the temperature was maintained at 115–120° C. The mixture was heated at 120° C. and stirred an additional 3 hours, then concentrated to 100 ml. and filtered. The filter cake was rinsed with dimethylformamide, and the filtrate and washings were distilled, the last stage in a molecular still, to give samples of [OX.E₃] and [Ox.E₃.Ox.E₃]. 2,6,9,12,15-pentaoxaspiro[3.12]hexadecane was obtained as a thick oil, B.P. 95–105° C. (1.5μ), in 7.1 g. (31%) yield. Hydroxylic impurities were removed by treatment with excess phenyl isocyanate at 100° C. for 10 hours followed by redistillation. The product, easily superheated, had a B.P. 70–80° C. (0.1μ); IR, 3.40 (sh.) and 3.47 (sat. C–H), 9.0 (broad, C—O—C), 10.02 and 10.25μ (oxetane ring); NMR [(CD₃)₂CO] δ 4.30 (s, 1), 3.83 (s., 1), 3.62 (s., 2), and 3.57 (s., 1).

Analysis.—Calcd. for $C_{11}H_{20}O_5$ (percent): C, 56.88; H, 8.68; O, 34.44; mol. wt., 232. Found (percent): C, 57.32; H, 8.59; O, 33.62; 33.40; mol. wt. 232 (field ionization mass spec.).

(B) 2,6,9,12,15,19,22,25,28,31 - decaoxadispiro[3.12.3.12]dotriacontane distilled at 185–198° C. (0.2μ) in the molecular still; 4.1 g. (18%): IR, 3.40 (sh.) and 3.48 (sat. C–H), 9.0 (broad, C—O—C), 10.22μ (oxetane ring); NMR [(CD₃)₂CO] δ 4.37 (s., 1), 3.72 (s., 1), 3.63 (s., 2), and 3.61 (s., 1).

Analysis—Calcd for $C_{22}H_{40}O_{10}$ (percent): C, 56.88; H, 8.68; O, 34.44; mol. wt. 464. Found (percent): C, 56.66; H, 8.74; O, 33.36; 33.28; mol. wt. 388 (ebul.).

EXAMPLE 2

Sodium hydride is also a suitable base, as shown by the following. A mixture of 50% sodium hydride/mineral oil (24.0 g., 0.5 mol) was washed free of oil with 2× 100 ml. of toluene, then 2× 100 ml. of ether and sucked dry under nitrogen. The sodium hydride was then flushed into a flask with 400 ml. of dry dimethylformamide and stirred under nitrogen while a solution of 31.0 g. (0.20 mol) of 3,3-di(chloromethyl)oxetane and 30.0 g. (0.20 mol) of triethylene glycol in 200 ml. of dimethylformamide was added dropwise over 6 hours. Hydrogen evolution persisted to the end of the addition. The mixture was stirred overnight at 25° C., after which considerable solid was present. The solid, completely soluble in 95% ethanol with some gas evolution, was apparently the disodium salt of triethylene glycol. A solution of 7.8 g. (0.05 mol) of 3,3-di(chloromethyl)oxetane and 7.5 g. (0.05 mol) of triethylene glycol in 250 ml. of dimethylformamide was added. The reaction mixture was stirred at 25° C. for 1 hour, 60° C. for 1 hour, and 100–110° C. for 4 hours, then cooled and filtered. Volatile materials were removed to ca. 50° C. (0.5 mm.), and the residue extracted with 3× 500 ml. of hexane followed by 2× 500 ml. of ether. Distillation of the hexane extracts gave 15.4 g. of [Ox.E₃], including a fairly pure fraction, 13.4 g. B.P. 95–97° C. (40μ). The distillation residue was combined with the ether extracts and distilled to afford an additional 5.6 g. of [OX.E₃] (21.0 g. or 36% total) and 6.7 g. (11%) of 2,6,9,12,15,19,22,25,28,31 - decaoxadispiro[3.12.3.12]dotriacontane, B.P. 200–225° C. (0.3μ).

EXAMPLE 3

(A) A mixture of 3 liters of t-butyl alcohol, 233.4 g. (2.08 mol) of potassium t-butoxide, 150.2 g. (1.00 mol) of redistilled triethylene glycol, and 155.0 g. (1.00 mol) of 3,3-di(chloromethyl)oxetane was stirred and refluxed under nitrogen for 2 days. The mixture was cooled, and to it was added 75.1 g. (0.50 mol) of triethylene glycol, 77.5 g. (0.50 mol) of 3,3-di(chloromethyl)oxetane, and 114.4 g. (1.02 mol) of potassium t-butoxide. The mixture was refluxed an additional day. Then the addition of 75.1 g. (0.50 mol) of triethylene glycol, 77.5 g. (0.50 mol) of 3,3-di(chloromethyl)oxetane, and 114.4 g. (1.02 mol) of potassium t-butoxide was repeated and the mixture was refluxed for 4 days. The reaction mixture was then cooled and neutralized with concentrated HCl (3 ml. or ca.0.04 mol of acid).

(B) Volatile materials were removed by distillation and the residue evacuated at 25° C. (0.25 mm.). The resulting oil and solid mixture was stirred with 2 liters of ether, filtered and the filter cake rinsed well with ether. Distillation of the filtrate gave 118.2 g. of 2,6,9,12,15-pentaoxaspiro[3.12]hexadecene, B.P. 80–90° C. (0.5μ) easily superheated. Of three fractions, 48.7 g. was pure and 69.5 g. contained hydroxylic impurity. The pure cut was analyzed.

Analysis.—Calcd. for $C_{11}H_{20}O_5$ (percent): C, 56.88; H, 8.68; O, 34.44. Found (percent): C, 56.81; H, 8.73; O, 34.41.

(C) The distillation residue was extracted with 4× 2 liters of n-hexane and the hexane evaporated to give 111 g. of yellow oil. This was combined with the impure 2,6,9,12,15-pentaoxaspiro[3.12]hexadecane and extracted continuously with pentane for 3 days. The extract was concentrated to 163 g. of high-boiling, viscous residue which showed only a trace of —OH absorption by the infrared spectrum. Distillation through a Vigreux column gave an additional 99.6 g. of [Ox.E₃], mainly B.P. 80–82° C. (10μ), for a total of 148.3 g. (32%). The distillation residue, 52 g., was shown by its infrared spectrum to be nearly pure 2,6,9,12,15,19,22,25,28,31 - decaoxadispiro[3.12.3.12]dotriacontane.

(D) The viscous residue from hexane extractions was treated with a solution of 97 g. (1.0 mol) of KCNS in 1 liter of acetone, and the volume of the mixture was reduced to 900 ml. On standing overnight, 41.2 g. of crystalline complex was obtained. The mixture was filtered, concentrated to 650 ml. and allowed to stand for 10 days. A second crop of crystals, 7.5 g., was collected after 3 days and a third crop, 5.8 g. M.P. 139–141° C., after another 10 days. The total weight of complex (see below for characterization)=54.5 g. The combined fractions of complex were boiled with 100 ml. of acetone, cooled, allowed to stand for 2 days, and filtered. The complex was boiled with another 100-ml. portion of acetone, cooled and filtered to give 43.8 g. of purified complex. This complex was heated at reflux for 2 hours with 100 ml. of xylene and the mixture filtered hot. The filtrate deposited a small amount of crystals on cooling; after another filtration the volatiles were removed up to 50° C. (0.5 mm.). The viscous residue, 28.8 g., was shown by infrared to be pure 2,6,9,12,15,19,22,25,28,31 - decaoxadispiro[3.12.3.12]dotriacontane; total yield of 80.8 g. was 17%. The sample of pure [Ox.E₃.Ox.E₃], which crystallized to a solid, M.P. 52–53° C., was analyzed.

*Analyzed.*—Calcd. for $C_{22}H_{40}O_{10}$ (percent): C, 56.88; H, 8.68; O, 34.44; mol. wt. 464. Found (percent): C, 56.91; H, 8.69; O, 34.27; mol. wt., 498 (ebul.).

EXAMPLE 4

2,6,9,12,15,18,21-heptaoxaspiro[3.18]docosane (abbreviated [Ox.E₅])

(A) Pentaethylene glycol was prepared by dropwise addition of 468 g. (2.5 mol) of 1,2-bis(2-chloroethoxy) ethane to a solution of 331 g. (5.0 mol) of 85% KOH pellets in 930 g. (15 mol) of ethylene glycol stirred and heated to 110° C. under nitrogen. The addition was carried out at a rate sufficient to maintain a reaction temperature of 120° C. with no external heating for 2 hours. The mixture was stirred and heated at 120° C. fo an additional 3 hours, cooled, acidified with concentrated HCl, and distilled. Pentaethylene glycol, 213.9 g. (36%), $n_D^{27}$ 1.4582, was obtained as a fraction, B.P. 148–154° C. (20μ).

A similar reaction with NaOH in place of KOH gave the same yield of pentaethylene glycol, B.P. 146–149° C. (10μ); $n_D^{27}$ 1.4590.

(B) A mixture of 600 ml. of t-butyl alcohol, 47.0 g. (0.42 mol) of potassium t-butoxide, 47.6 g. (0.20 mol) of pentaethylene glycol, and 31.0 g. (0.20 mol) of 3,3-di(chloromethyl)oxetane was stirred at reflux under nitrogen for 5 days. The mixture was cooled and filtered, and the filter cake was rinsed with t-butyl alcohol and dried to give 30.1 g. of KCl. Removal of volatiles from the filtrate up to 50° C. (0.5 mm.) afforded 67 g. of viscous residue, which was extracted continuously with pentane for 3 days. The extracts yielded 49.3 g. of high-boiling residue; distillation gave 38.5 g. (60%) of 2,6,9,12,15,18, 21-heptaoxaspiro[3.18]docosane, mainly B.P. 136–137° C. (1μ) in a molecular still: IR, 3.40 (sh.) and 3.47 (sat. C—H), 9.0 (C—O—C), and 10.21μ (oxetane ring); MNR [(CD₃)₂CO], δ 4.29 (s., 1), 3.65 (s., 1), 3.56 (s., 2), and 3.52 p.p.m. (s, 3).

*Analysis.*—Calcd. for $C_{15}H_{28}O_7$ (percent): C, 56.23; H, 8.81; O, 34.96; mol. wt., 320. Found (percent): C, 56.51; H, 9.18; O, 34.84; mol. wt., 320 (mass spec.).

EXAMPLE 5

2,6,9-trioxaspiro[3.6]decane (abbreviated [Ox.E] and 2,6,9,13,16,19-hexaoxadispiro[3.6.3.6]eicosane (abbreviated [Ox.E.Ox.E])

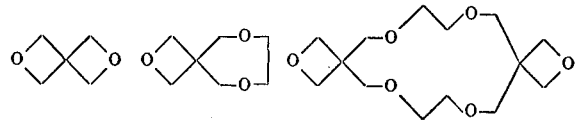

(A) A solution of 12.4 g. (0.20 mol) of ethylene glycol, 47.0 (0.42 mol) of potassium t-butoxide, and 31.0 g. (0.20 mol) of 3,3-bis(chloromethyl)oxetane in 500 ml. of t-butyl alcohol was stirred and refluxed under nitrogen for 2 days. The mixture was cooled, addition of the three reactants repeated, and reaction continued for an additional 5 days. Work-up as described in Example 4–B gave 38.3 g. pentane-soluble oil and 0.8 g. of 2,6-dioxaspiro [3.3]heptane as a volatile solid. Sublimation of the latter gave 0.31 g. (0.8%) of pure 2,6-dioxaspiro[3.3]heptane, M.P. 89–90° C. (sublimed) (lit. M.P. 90° C.); mass spectrum, m/e 100 (parent⁺), 70 (p⁺—CH₂O); IR (Nujol), 10.31 and 10.92μ (oxetane ring); NMR (acetone-d₆); δ 4.70 p.p.m. (s).

(B) Distillation of the high-boiling oil gave 24.2 g. (42%) of 2,6,9-trioxaspiro[3.6]decane [Ox.E], B.P. 97–99° C. (10 mm.); IR, 3.41 and 3.48 (sat. CH), 8.8–9.1 (C—O—C), 10.19 and 10.85μ (oxetane ring); NMR (acetone-d₆); δ 4.36 (s., 1), 3.99 (s., 1), and 3.63 p.p.m. (s., 1).

*Analysis.*—Calcd. for $C_7H_{12}O_3$ (percent): C, 58.32; H, 8.40; O, 33.29. Found (percent): C, 57.99; H, 8.23; O, 32.89.

(C) Isolation of solid from the distillation residue gave, after recrystallization from ether, 0.42 g. (0.7%) of 2,6,9,13,16,19-hexaoxadispiro[3.6.3.6]eicosane

[Ox.E.Ox.E]

M.P. 163–165° C. This was recrystallized from acetone for analysis: mass spectrum, m/e 288 (weak parent⁺), 289 (weak p+H⁺), 258 (strong p⁺—CH₂O); IR (Nujol), 8.7–9.1 (C—O—C), 10.29, 10.42, and 10.68μ (oxetane); NMR (acetone-₆); δ 4.30 (s., 1), 3.80 (s., 1), and 3.63 p.p.m. (s., 1).

*Analysis.*—Calcd. for $C_7H_{12}O_3$ (percent): C, 58.32; H, 8.40. Found (percent): C, 58.88, 58.92; H, 8.05, 8.47.

EXAMPLE 6

2,6,9,12-tetraoxaspiro[3.9]tridecane (abbreviated [Ox.Ex₂]) and 2,6,9,12,16,19,22,25-octaoxadispiro[3.9.3.9]hexacosane (abbreviated [Ox.E₂.Ox.E₂])

(A) A two-stage reaction in 3.0 liters of t-butyl alcohol, each involving addition of 233.4 g. (2.08 mole) of potassium t-butoxide, 106.0 g. (1.00 mol) of diethylene glycol, and 155.0 g. (1.00 mol) of 3,3-bis(chloromethyl) oxetane, gave 389 g. of partially crystalline crude product and a few grams of volatile spirooxteane, 3,6,9,12,15-pentaoxaspiro[3.12]hexadecane, after removal of KCl and solvent. The residue was dissolved in 650 ml. of CH₂Cl₂, filtered, and volume reduced to 400 ml. The resulting mixture was diluted with 400 ml. of ether, cooled to 0° C. and filtered to give 154 g. of crude 2,6,9,12,16, 19,22,25-octaoxadispiro[3.9.3.9]hexacosane

[Ox.E₂.Ox.E₂]

M.P. 81.5–84° C. A second crop, 27.4 g., M.P. 74–80° C., was also obtained. The filtrate from the second crop was evaporated up to 50° C. (0.5 mm.) and the residue extracted continuously with pentane for 7 days to give crude insoluble solid (A) and pentane solution. Distillation of the pentane solution gave 1.44 g. of impure 2,6,9,12-tetraoxaspiro[3.9]tridecane [Ox.E₂], B.P. ~100–120° C. (0.3 mm.). The distillate was extracted with 20 ml. of water and insolubles removed by extraction with 2× 2 ml. of ligroin. The aqueous layer was evaporated to give 0.68 g. (0.2%) of [Ox.E₂]; mass spectrum, m/e 188 (weak parent⁺), 189 (weak p+H⁺), and 158 (strong, p⁺—CH₂O); IR, 2.97 (weak OH impurity), 3.45 and 3.52 (sat. CH), 8.7–9.2 (C—O—C), 10.08 and 10.7μ (oxetane ring); NMR (acetone-d₆); δ 4.28 (s., 1), 3.92 (s., 1), and 3.62 p.p.m. (s., 2) with three weak (ca. 5%) impurity peaks also present.

*Analysis.*—Calcd. for C₉H₁₆O₄ (percent): C, 57.43; H, 8.57. Found (percent): C, 57.38; H, 8.48.

(B) The two crops of [Ox.E₂.Ox.E₂] were combined and recrystallized by continuous extraction with 500 ml. of ether to give 127.4 g. of pure product, M.P. 85.5–86.5° C. The filtrate and crude solid (A) were combined and concentrated, and the residue extracted continuously with pentane. The crude product so obtained, 44.2 g., M.P. 80–84° C., was recrystallized from ether to give 28.6 g. of pure compound, M.P. 85–86° C. All crude fractions were then combined, concentrated, allowed to solidify partially and pressure filtered. The product so obtained was recrystallized from ether to give 19.7 g. of product, M.P. 84.5–85.5° C., making a total of 176 g. (47%) of purified 2,6,9,12,16,19,22,25-octaoxadispiro[3.9.3.9]hexacosane. Analytical samples from this and a previous run were prepared by recrystallization from ether, M.P. 86–87° C.: IR (Nujol )8.7–9.1 (C—O—C), 10.05, 10.32, 10.55, and 10.76μ (oxetane ring); NMR (acetone-d₆) δ 4.36 (s., 1), 3.73 (s., 1), and 3.63 p.p.m. (s., 2).

*Analysis.*—Calcd. for C₁₈H₃₂O₈ (percent): C, 57.43; H, 8.57; O, 34.00; mol. wt., 376.5. Found (percent): C, 58.02; H, 8.79; O, 33.68; mol. wt., 390 (ebul. in benzene).

EXAMPLE 7

2,6,9,12,15,18-hexaoxaspiro[3.15]nonadecane (abbreviated [Ox.E₄])

Reaction of 38.8 g. (0.20 mol) of tetraethylene glycol, 47.0 g. (0.42 mol) of potassium t-butoxide, and 31.0 g. (0.20 mol) of 3,3-bis(chloromethyl)oxetane was carried out in 500 ml. of t-butyl alcohol as described in Example 4. A second, equivalent addition of the three reagents was made after 1 day. Distillation in a molecular still gave 58.2 g. (53%) of 2,6,9,12,15,18-hexaoxaspiro-[3.15]nonadecane as a colorless oil, B.P. 105–108° C. (0.2μ); IR 3.40 (sh.) and 3.47 (sat. CH), 8.7–9.1 (C—O—C), 10.23 and 10.68μ (oxetane ring); NMR (acetone-d₆) δ 4.32 (s., 1), 3.73 (s., 1), 3.59 (s., 2), and 3.55 p.p.m. (s., 2).

*Analysis.*—Calcd. for C₁₃H₂₄O₆ (percent): C, 56.50; H, 8.75; O, 34.74. Found (percent): C, 56.49; H, 8.70; O, 34.78.

EXAMPLE 8

2,6,9,12,15,18,21,24,27 - nonaoxaspiro[3.24]octacosane, (abbreviated [Ox.E₇]) and 2,6,9,12,15,18,21,24,27,31, 34,37,40,43,46,49,52,55-octadecaoxadispiro

[3.24.3.24]

hexapentacontane (abbreviated [Ox.E₇.Ox.E₇]

(A) A mixture of 1590 g. (15 mol) of diethylene glycol and 200 g. (5.0 mol) of NaOH pellets was stirred and heated to 110° C. under nitrogen. Dropwise addition of 468 g. (2.5 mol) of 1,2-bis(2-chloroethoxy)ethane was carried out at a rate sufficient to keep the temperature near 120° C. without external heating; addition time was 1.5 hours. The mixture was heated and stirred at 120° C. for another 3 hours, cooled, filtered and distilled through Vigreux column. Heptaethylene glycol was obtained as 270.6 g. (33%) of an oil, B.P. 207–213° C. (4.5μ); n_D²⁶ 1.4627 (lit.: B.P. 241–244° C. (0.6 mm.) n_D²⁰ 1.4653).

(B) Reaction was carried out as described in Example 4 in 700 ml. of t-butyl alcohol using two additions, each of 65.2 g. (0.20 mol) of heptaethylene glycol, 47.0 g. (0.42 mol) of potassium t-butoxide, and 31.0 g. (0.20 mol) of 3,3-bis(chloromethyl)oxetane. Distillation in a molecular still gave 58.0 g. (35%) of 2,6,9,12,15,18,21, 24,27 - nonaoxaspiro[3.24]octacosane, B.P. 182–183° C. (0.3μ); IR 3.48 (sat. CH), 8.7–9.2 (C—O—C), 10.23 and 10.65μ (oxetane ring); NMR (acetone-d₆), δ 4.37 (s., 1), 3.72 (s., 1), 3.63 (s., 2), and 3.60 p.p.m. (s., 5).

*Analysis.*—Calcd. for C₁₉H₃₆O₉ (percent): C, 55.87; H, 8.88; O, 35.25. Found (percent): C, 55.62; H, 8.66; O, 35.02.

(C) The distillation residue slowly deposited crystals on standing. The mixture of solid and oil was crystallized from 1:1 ether/ligroin at −80° C., from 1:1 ether/acetone at −80° C., from 1:1 ether/acetone at 0° C., and finally from ether at 0° C. to give 2.2 of 2,6,9,12,15,18, 21,24,27,31,34,37,40,43,46,49,52,55 - octadecaoxadispiro-[3.24.3.24]hexapentacontane, M.P. 42–43° C. A second crop, 2.1 g., M.P. 40–41° C., was obtained by concentration of the filtrates and two recrystallizations from ether at 0° C., bringing the yield to 4.3 g. (2.6%): IR (Nujol) 8.7–9.2 (C—O—C), 10.07, 10.29, and 10.37μ (oxetane ring); NMR (acetone-d₆), δ 4.36 (s., 1), 3.67 (s., 1), 3.61 (s, 2), 3.58 and 3.57 p.p.m. (two singlets, combined area 5).

*Analysis.*—Calcd. for C₃₈H₇₂O₁₈ (percent): C, 55.87; H, 8.88; O, 35.25; mol. wt., 817. Found (percent): C, 56.39, 56.48; H, 8.58, 8.93; O, 34.82, 34.65; mol. wt., 798 (ebul. in benzene).

EXAMPLE 9

2,6,9,12,15,18,21,24,27,30,33 - undecaoxaspiro[3.30]tetratriacontane (abbreviated [Ox.E₉]) and 2,6,9,12,15, 18,21,24,27,30,33,37,40,43,46,49,52,55,61,64,67 - docosaoxadispiro[3.30.3.30]octahexacontaine (abbreviated [Ox.E₉.Ox.E₉])

(A) A mixture of 2252 g. (15 mol) of triethylene glycol and 200 g. (5.0 mol) of NaOH pellets was reacted with 468 g. (2.5 mol) of 1,2-bis(2-chloroethoxy)ethane as described above. Distillation through a Vigreux gave 251.2 g. (24%) of orange oil, B.P. 235–249° C.; n_D²⁶ 1.4644. As expected for nonaethylene glycol, the product solidified slowly at 0° C.

(B) Two additions, each of 82.8 g. (0.20 mol) of the nonaethylene glycol of Part A, 47.0 g. (0.42 mol) of potassium t-butoxide, and 31.0 g. (0.20 mol) of 3,3-bis-(chloromethyl)oxetane, were made to a reaction mixture carried out in 1 liter of t-butyl alcohol as described in Example 4. Volatile products were 1.5 g. (4%) of 2,6-dioxaspiro[3.3]heptane, M.P. 89° C., 22.0 g. (11%) of 2,6,9,12,15,18,21,24,27,30,33 - undecaoxaspiro[3.30]tetratriacontaine; B.P. 250–260° C. (1μ) in a molecular still; IR; 3.45 (sat. CH), 8.7–9.1 (C—O—C), 10.20 and 10.62μ (oxetane ring); NMR (acetone-d₆) δ 4.37 (s., 1), 3.70 (s., 1), 3.63 (s., 2), and 3.60 p.p.m. (s., 7).

*Analysis.*—Calcd. for C₂₂H₄₄O₁₁ (percent): C, 55.63; H, 8.93; O, 35.44. Found (percent): C, 55.88; H, 8.76; O, 35.76.

(C) Pentane extraction of product mixture to obtain crude [Ox.E₉] in Part B above was carried out for 13 days. A second pentane extraction for 6 days gave 3.1 g. of nonvolatile yellow oil which solidified at 0° C. This material was crystallized from ether at −80° C., ether at −30° C., 1:1 ether/acetone at −30° C., 2:1 ether/ligroin at 0° C., and 5:1 ether/ligroin at 0° C. At this point the NMR spectrum showed impurities greatly reduced, M.P. 19–21° C. Another crystallization from ether/ligroin, which resulted in little change judging by the NMR spectrum, gave 0.48 g. (0.3%) of solid, M.P. 19–21° C. This product is somewhat impure 2,6,9,12,15, 18,21,24,27,30,33,37,40,43,46,49,52,55,58,61,64,67 - docosaoxadispiro[3.30.3.30]octahexacontane: IR 3.46 (sat. CH), 8.7–9.1 (C—O—C), 10.22 and 10.55μ (oxetane ring); NMR (acetone-d₆) δ 4.38 (s., 1), 3.70 (s., 1), 3.64 and 3.62 (two singlets, combined area 10.5 indicating presence of impurity), 1.2 p.p.m. (impurity peaks, 0.3).

Analysis.—Calcd. for $C_{46}H_{88}O_{22}$ (percent): C, 55.63; H, 8.93; O, 35.44; mol. wt., 993. Found (percent): C, 55.27; H, 8.55; O, 34.61, 36.38, 35.54; mol. wt., 665 (ebul. in benzene).

Complexes of macrocyclic ethers: These macrocyclic polyethers are effective complexing agentes for alkali and alkaline earth metals as shown by the preparation of a number of well-defined complexes. Derivatives were prepared from alkali metal thiocyanates and calcium iodide, in order to make use of homogeneous acetone solutions of the salts. These solutions (filtered in the case of LiSCN to remove insolubles) were then added either to the liquid polyether or to a solution of polyether in acetone. Concentration to small volume under nitrogen and scratching were generally effective in causing crystallization. Recrystallizations were from acetone or acetone/ether. Melting points were characteristically sharp. Infrared spectra of the thiocyanate complexes were similar to those of the parent macrocycles except for the addition of a band for thiocyanate at about 4.9μ. Stoichiometry of the complexes was determined primarily by C, H and N values. Ratios of metal salt:polyether greater than one are unusual and indeed appear not to have been observed previously.

EXAMPLE 10

Complex of LiSCN with [Ox.E₃]

A solution of 0.26 g. (0.004 mol) of LiSCN in 20 ml. of acetone was filtered and to it was added 0.9 g. (0.004 mol) of 2,6,9,12,15 - pentaoxaspiro[3.12]hexadecane. Evaporation under nitrogen to small volume resulted in crystallization. After 2 days the small amount of supernatant liquid was removed and the residue triturated twice with a small amount of ether. The dried residue, 0.81 g. (70%), M.P. 129–133° C. was dissolved in acetone and precipitated with an equal volume of ether, 0.66 g. (57%), M.P. 137–138° C. Another crystallization gave the 1:1 complex, M.P. 138–139° C.

Analysis.—Calcd. for $C_{12}H_{20}LiNO_5S$ (percent): C, 48.48; H, 6.78; Li, 2.33; N, 4.71. Found (percent): C, 49.24, 49.37; H, 6.73, 6.86; Li, 1.22; N, 4.66.

Lithium thiocyanate formed noncrystallizable glasses with [Ox.E₅] (Example 4), [Ox.E₂.Ox.E₂] (Example 6) and [Ox.E₄] (Example 7). These complexes were sufficiently stable not to dissociate partially when contacted with ether.

The LiSCN complex with [Ox.E₃.Ox.E₃] (Example 1) was a crystalline product, M.P. 192–193° C.

Analysis.—Calcd. for $C_{24}H_{40}Li_2N_2O_{10}S_2$ (percent): C, 48.48; H, 6.78; Li, 2.33; N, 4.71. Found (percent): C, 48.33; H, 6.86; Li, 1.33; N, 4.59, 4.92.

EXAMPLE 11

A sodium thiocyanate complex, NaSCN[Ox.E₃], was deliquescent and tended to undergo partial loss of [Ox.E₃] when contacted with ether, M.P. 164–165° C.

Analysis.—Calcd. for $C_{12}H_{20}NNaO_5S$ (percent): C, 45.99; H, 6.43; N, 4.47; Na, 7.34. Found (percent): C, 41.67, 41.77; H, 5.44, 5.62; N, 4.56, 4.77; Na, 8.89.

NaSCN [Ox.E₄]; yield 25% (very soluble) M.P. 135.5–137° C.

Analysis.—Calcd. for $C_{14}H_{24}NNaO_6S$ (percent): C, 47.05; H, 6.77; N, 3.92; Na, 6.44. Found (percent): C, 47.27, 47.42; H, 6.86, 6.77; N, 3.95; Na, 6.01.

NaSCN[Ox.E₅]; yield 72%, M.P. 127–128° C.

Analysis.—Calcd. for $C_{16}H_{28}NNaO_7S$ (percent): C, 47.86; H, 7.03; N, 3.49; Na, 5.73. Found (percent): C, 47.66; H, 6.72; N, 3.36; Na, 5.35.

3NaSCN [Ox.E₂.Ox.E₂]₂; yield 91%, M.P. 70° C.

Analysis.—Calcd. for $C_{39}H_{64}N_3Na_3O_{16}S_3$ (percent): C, 47.02; H, 6.48; N, 4.22; Na, 6.92. Found (percent): C, 46.98; H, 6.65; N, 3.57, 3.91; Na, 7.06.

2NaSCN [Ox.E₃.Ox.E₃]; yield 82%, M.P. 165–166° C.

Analysis.—Calcd. for $C_{24}H_{40}N_2Na_2O_{10}S_2$ (percent): C, 45.99; H, 6.43; N, 4.47; Na, 7.34. Found (percent): C, 45.99; H, 6.43; N, 4.13; Na, 6.89, 8.20.

EXAMPLE 12

Potassium thiocyanate

A complex of KSCN with [Ox.E₃] appeared to form, but dissociated so readily that the ligand was removed by contact with ether.

KSCN [Ox.E₄]; yield 55%, M.P. 105–109° C.

Analysis.—Calcd. for $C_{14}H_{24}KNO_6S$ (percent): C, 45.02; H, 6.48; K, 10.47; N, 3.75. Found (percent): C, 44.73; H, 6.12; K, 10.40; N, 4.06.

KSCN [Ox.E₅]; yield 73%, M.P. 124–126° C.

Analysis.—Calcd. for $C_{16}H_{28}KNO_7S$ (percent): C, 46.02; H, 6.76; K, 9.36; N, 3.35. Found (percent): C, 46.24; H, 7.03; K, 8.94; N, 3.66.

8KSCN [Ox.E₂.Ox.E₂]₇; yield 96%, M.P. 103–105° C.

Analysis.—Calcd. for $C_{134}H_{224}K_8N_8O_{56}S_8$ (percent): C, 47.16; H, 6.62; K, 9.17; N, 3.28. Found (percent): C, 46.74, 46.71; H, 6.46, 6.32; K, 9.08; N, 3.56, 3.41, 3.12.

2KSCN [Ox.E₃.Ox.E₃]; M.P. 140–141° C.

Analysis.—Calcd. for $C_{24}H_{40}K_2N_2O_{10}S_2$ (percent): C, 43.75; H, 6.12; K, 11.87; N, 4.25. Found (percent): C, 44.09, 43.76; H, 6.32, 6.11; K, 10.20, 11.20; N, 4.16, 4.10.

EXAMPLE 13

Calcium iodide

A solution of 0.59 g. (0.002 mol) of anhydrous calcium iodide in 15 ml. of acetone was filtered and 1.28 g. (0.004 mol) of [Ox.E₅] (Example 4-B) was added with swirling to give immediate formation of white precipitate. After 2 days the supernatant liquid was removed and evaporated to give 0.7 g. of recovered [Ox.E₅]. The complex, slightly soluble in acetone, was boiled with 25 ml. of acetone, filtered, and rinsed with acetone. After drying at 100° C. (0.5 mm.) for 2 hours, there was obtained 0.95 g. (77%) of 1:1 complex, M.P. 176–178° C. NMR indicated the presence of approximately 1 mol of water, confirmed by the infrared spectrum. Analyses for iodine decreased with time, indicating reaction with $CO_2$ and $H_2O$ to form $CaCO_3$.

Analysis.—Calcd. for $C_{15}H_3CaI_2O_8$ (percent): C, 28.49; H, 4.78; Ca, 6.34; I, 40.14. Found (percent): C, 28.67; H, 5.01, 5.16; Ca, 6.33; I, 38.13, 34.64, 33.78, 23.86.

EXAMPLE 14

Polymerization of [Ox.E₃] (Example 1)

A 10-ml. vial, dried at 150° C. in a stream of nitrogen and fitted with a serum cap, was charged with 0.01 ml. of BF₃ etherate. Then 0.9 ml. of [Ox.E₃] (Example 1) was introduced. The first drops to contact the catalyst polymerized rapidly, but the major portion remained liquid. An additional 0.04 ml. of BF₃ etherate was added and further rapid, but incomplete polymerization occurred. After 5 to 10 minutes, localized overheating had resulted in dark spots in the polymer. The mixture was allowed to stand overnight at 25° C., then suspended in 5 ml. of ether and filtered. The solid polymer, washed well with ether, weighed 0.43 g. (about 50%) and consisted mainly of rubbery white polymer mixed with brown and black sections. On a melting point block, the material became nearly all colorless near 150° C., then slowly discolored at 180–200° C. with obvious softening. The material was insoluble in hot tetrahydrofuran, hot methanol and hot bis(trifluoromethylcarbinol), although the solvents did swell the polymer and extract colored impurities. A sample triturated with methanol, dried, and heated to 150° C. was analyzed.

Analysis.—Calcd. for $(C_{11}H_{20}O_5)_x$ (percent): C, 56.88; H, 8.68. Found (percent): C, 54.12, 53.87; H, 8.36, 8.21.

Table I summarizes the results of other polymerizations of [Ox.E$_3$].

cedure with no polymer present gave no KSCN extraction from the aqueous phase.

TABLE I

| Example | Mols of [Ox. E$_3$] | Catalyst | Mols of catalyst | Solvent | Temperature | Time | Results |
|---------|---------------------|----------|------------------|---------|-------------|------|---------|
| 15 | 0.05 | BF$_3$-ether | 0.007 | CH$_2$Cl$_2$ | 25° C | 16 hours | 20%[1] soluble ether, $\eta_{inh}$=0.05; 34% soluble $\varphi$H, insol ether, $\eta_{inh}$=0.1. |
| 16 | 0.025 | $\varphi_3$CAsF$_6$ | 0.00025 | Neat | 70° C | 5 hours | 86%,[1] soluble ether, CH$_2$Cl$_2$, $\eta_{inh}$=0.04. |
| 17 | 0.025 | $\varphi_3$CAsF$_6$ | 0.00025 | CH$_2$Cl$_2$ | 25° C | 1 week | 81%,[1] soluble ether, CH$_2$Cl$_2$, $\eta_{inh}$=0.05. |
| 18 | 0.025 | BF$_3$-ether | 0.001 | CH$_3$Cl | −24° to +25° C | 3 days | 60%,[1] soluble CH$_2$Cl$_2$, insol. ether, $\eta_{inh}$=0.06. |
| 19 | 0.054 | PF$_5$ | Small amount | CH$_2$Cl$_2$ | 0° C | 16 hours | Ca. 100%,[1] immobile dark gel, enormously (20X) swollen by CHCl$_3$, formic acid. Calcd for (C$_{11}$H$_{20}$O$_5$): C, 56.88; H, 8.6S; Found: C, 56.67; H. 8.35. |
| 20 | 0.027 | PF$_5$ | do | CH$_2$Cl$_2$ | 0° C | 1 hour | 72%,[1] soluble CH$_2$Cl$_2$, insol. ether, $\eta_{inh}$=0.04. |
| 21 | 0.027 | PF$_5$ | do | CH$_2$Cl$_2$ | 0° C | 6 hours | 98%,[1] insoluble gel, absorbs large amounts CH$_2$Cl$_2$, water. |
| 22 | 0.027 | PF$_5$ | do | CH$_2$Cl$_2$ | 0° C | 3.7 hours | 59%,[1] gel polymer; 38% soluble polymer, $\eta_{inh}$=0.18. |

[1] Percentage yields.

Samples of polymer soluble in acetone-d$_6$ gave nmr proton signals at $\delta$ 3.61 (sharp singlet) and 3.50 p.p.m. (broad) with no indication of oxetane ring at ~4.3 p.p.m. Similarly, infrared spectra showed no strong bands for oxetane in the 10.05–10.75$\mu$ region. Polymer originally soluble in ether and benzene was converted to a 1:0.7 polymer/NaSCN complex insoluble in ether and benzene as in Example 23.

EXAMPLE 23

Polymer of [Ox.E$_3$] (0.9 g.; 0.004 eq.), soluble in both ether and benzene, was dissolved in 10 ml. of acetone along with 0.32 g. (0.004 mole) of NaSCN. The solution was filtered, concentrated to 5 ml., and diluted with 5 ml. of ether. The taffy-like polymer was isolated and extracted with benzene, in which it was now insoluble. The product was partially dissolved in CH$_2$Cl$_2$, the solution filtered, and CH$_2$Cl$_2$ evaporated. The residue was taken up in water, decanted from a small amount of oil, and solvent removed to give 0.38 g. of polymeric complex.

*Analysis.*—Calcd. for 1:1 complex (percent): C, 45.99; H, 6.43; N, 4.47. Found (percent): C, 48.06; H, 6.99; N, 3.46.

EXAMPLE 24

Polymerization of [Ox.E$_5$]

(A) An oven-dried flask was charged with 100 ml. of CH$_2$Cl$_2$ (dried over Linde 4A molecular sieves) and 20 ml. (25.2 g.; 0.079 mol) of purified [Ox.E$_5$] (Example 4–B). The resulting solution was stirred under nitrogen at 0° C. while 20 ml. of PF$_5$ gas was introduced with a syringe. After the mixture had stirred for 5.75 hours at 0° C., an additional 40 ml. of PF$_5$ gas was introduced. After another 0.5 hour, the ice bath was removed and the mixture allowed to warm to 25° C. overnight.

The dark mixture was treated with 20 ml. of distilled water and 12 ml. of concentrated NH$_3$, at which point the color changed to light orange. The mixture was stirred well, the water layer removed, and the CH$_2$Cl$_2$ solution washed with 30 ml. of water and evaporated on the steam bath to give a viscous residue. This polymer was extracted with 3× 10 ml. of ether and the ether-insoluble product dried at 100° C. (0.5 mm.). This yielded 19.1 g. (76%) of glassy polymer, $\eta_{inh}$=0.09.

*Analysis.*—Calcd. for (C$_{15}$H$_{28}$O$_7$)$_n$ (percent): C, 56.23; H, 8.81. Found (percent): C, 55.87; H, 8.49.

(B) This polymer is capable of extracting potassium ion from water. A solution of 0.90 g. (0.0028 eq.) of polymer and 0.30 g. (0.0031 mol) of KSCN in 15 ml. of water was contacted with 25 ml. of CH$_2$Cl$_2$. The CH$_2$Cl$_2$ layer was separated, clarified by filtration through a cotton plug, and evaporated to give 1.0 g. of viscous residue. A strong infrared band at 4.84$\mu$ indicated the presence of SCN in the polymeric complex. Analysis found: K, 2.18; N, 0.73.

The analysis shows that 17% of the KSCN was removed from the aqueous solution based on N analysis, 18% based on K analysis. Repetition of the extraction pro-

EXAMPLE 25

Copolymer of [Ox.E$_5$] and [Ox.E$_2$.Ox.E$_2$] (Examples 4–B and 6–B)

(A) A minor amount of the difunctional monomer [Ox.E$_2$.Ox.E$_2$] incorporated into a polymer of [Ox.E$_5$] resulted in crosslinking a highly swollen gel which is insoluble in water and in CH$_2$Cl$_2$. Such polymers remain as a separate phase in contact with water and eliminate the need for an organic solvent such as CH$_2$Cl$_2$ in the extraction of a metal ion from water.

(B) A solution of 5.0 g. (0.013 mol) of [Ox.E$_2$.Ox.E$_2$] and 25.2 g. (0.079 mol) of [Ox.E$_5$] in 100 ml. of dry CH$_2$Cl$_2$ was stirred at 0° C. while 30 ml. of PF$_5$ gas was introduced. After 5 hours at 0° C., the reaction mixture had set to a light yellow gel. A solution of 10 ml. of concentrated NH$_3$ and 25 ml. of water was added, the gel thoroughly broken up, and the mixture allowed to stand overnight. The water layer was decanted, the polymer washed with 100 ml. of water, 200 ml. of ether, 200 ml. of ether, and 300 ml. of water. After drying under a slow stream of nitrogen until no ether odor was detectable (several days), the soft, clear, nearly colorless, sticky gel weighed 38.3 g. Considerable water was still present.

This polymer was used directly in an extraction of KSCN. A solution of 0.91 g. (0.0091 mol) of KSCN in 50 ml. of distilled water was stirred at 25° C. for 2.5 hours with 6.3 g. (ca. 0.01 mol) of gel polymer. Filtration gave 46 ml. of aqueous solution. The polymer was stirred with 25 ml. of distilled water, filtered, and partially dried overnight in a slow stream of nitrogen to give 4.1 g. of polymeric complex. Analyses found: K, 2.07; N, 0.65, 0.83, and 0.73.

The analysis corresponds to removal of 24% (0.22 g.) of KSCN from the aqueous phase based on either K analysis or the average N analysis. Evaporation of the aqueous mother liquor and heating the residue at 100° C. (1 mm.) gave 0.63 g. of recovered KSCN. The water-wash treated product similarly gave 0.08 g. of KSCN. The total of 0.72 g. of recovered KSCN indicates that 0.19 g. of KSCN was complexed in the polymer.

EXAMPLE 26

2,9-dioxa-6,12 - dithiaspiro[3.9]tridecane and 2,9,16,22-tetraoxa-6,12,19,25-tetrathiadispiro[3.9.3.9]hexacosane A mixture of 31.0 g. (0.20 mol) of 3,3-bis(chloromethyl)oxetane, 27.7 g. (0.20 mol) of bis(2-mercaptoethyl) ether, 3.8 liters of absolute ethanol, and 16.0 g. (0.40 mol) of sodium hydroxide pellets was stirred and refluxed under nitrogen for 1 day. Addition of the same amounts of oxetane, mercaptoethyl ether and sodium hydroxide was repeated and reaction continued another day. The addition was repeated once more and reaction continued an additional 3 days, after which pH was ca. 9. The reaction mixture was filtered, the filtrate evaporated to 500 ml. and supernatant was decanted. The viscous residue was extracted with 3× 100 ml. ethanol, then the combined supernatant and extracts evaporated to give high-boiling residue. Continuous ether extraction of this residue, removal of ether from the extracts, and sublimation of the extracted product at 100° C. (0.1 mm.) gave 21.0 g. (16%) of crude 2,9-dioxa-6,12-dithiaspiro[3.9] tridecane, M.P. 102–105° C. An analytical sample, M.P. 104–105° C., was prepared by resublimation at 75° C. (0.025 mm.), followed by trituration with ether and drying: IR (Nujol) 9.03 (C—O—C), 10.21 and 10.70μ (oxetane); NMR (acetone-d₆); δ 4.22 (s., 1), 3.52 p.p.m. (s.,1) with rough triplets for AA'BB' at 230, 226 and 220 Hz. (1) and 172, 167 and 162 Hz. (1).

*Analysis.*—Calcd. for $C_9H_{16}O_2S_2$ (percent): C, 49.05; H, 7.32; S, 29.10; mol. wt., 220. Found (percent): C, 49.49; H, 7.31; S, 28.61; mol. wet. 221 (ebul.).

The nonvolatile sublimation residue was kept molten at 90–95° C. and continuously extracted with n-heptane for 2 days. Evaporation of heptane from the extract and recrystallization from acetone gave 17.7 g. of 2,9,16,22-tetraoxa-6,12,19,25 - tetrathiadispiro[3.9.3.9]hexacosane, M.P. 100–101° C. A second crop. 1.9 g., M.P. 98.5–100° C., was also obtained, for a total of 19.6 g. (15%). An analytical sample, M.P. 100.5–101.5° C., was prepared by recrystallization from acetone: IR (Nujol) 9.05 (C—O—C), 10.15 and 10.53μ (oxetane); NMR (acetone-d₆); δ 4.35 (s., 1) and 3.14 p.p.m. (s., 1) with rough triplets for AA'BB' at 229, 223, and 217 Hz. (1) and 175.5, 169.5 and 163.5 Hz. (1).

*Analysis.*—Calcd. for $C_{18}H_{32}O_4S_4$ (percent): C, 49.06; H, 7.32; S, 29.10; mol. wt., 440.7. Found (percent): C, 49.41; H, 7.75; S, 29.32; mol. wt., 438 (ebul.).

A 2:1 complex of the above dispiro compound with NaSCN was obtained by stirring 1.10 g. (0.0025 mol) of 2,9,16,22-tetraoxa - 6,12,19,25 - tetrathiadispiro[3.9.3.9] hexacosane and 0.40 g. (0.005 mol) of NaSCN with 40 ml. of acetone for 1 day. Filtration gave 1.04 g. (87%) of the complex, M.P. 166–168° C. Recrystallization from acetone gave a sample, M.P. 167.5–169° C., which showed infrared absorption of SCN at 4.87μ.

*Analysis.*—Calcd. for $C_{37}H_{64}NNaO_8S_9$ (percent): C, 46.17; H, 6.70; N, 1.46; Na, 2.39; S, 29.98. Found (percent): C, 46.59; H, 6.64; N, 1.48; Na, 2.36; S, 30.13.

EXAMPLE 27

2,16-dioxa-6,9,12,19,22,25-hexathiadispiro[3.9.3.9] hexacosane

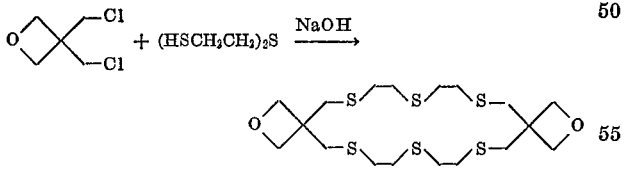

A mixture of 31.0 g. (0.20 mol) of 3,3-bis(chloromethyl)oxetane, 30.8 g. (0.20 mol) of bis(2-mercaptoethyl)sulfide, 16.0 g. (0.40 mol) of sodium hydroxide, and 3.8 l. of absolute alcohol was stirred and refluxed under nitrogen for one day. Addition of the oxetane, sulfide and sodium hydroxide was repeated and reaction continued another day. The addition was repeated once more and reaction continued an additional 3 days, after which pH ~8. Solvent was removed and the residue heated at 70° during continuous extraction with benzene for 15 days. Solvent was removed from the extract and the residue heated at 95° during continuous extraction with n-heptane for 12 days. Removal of solvent from the extract gave a viscous residue from which only a little oil was volatilized at 100° (0.4 mm.). Crystallization of the residue from toluene gave 15.6 g. (11%) of 2,16 -dioxa-6, 9,12,19,22,25 - hexathiadispior[3.9.3.9]hexacosane, M.P. 129–131°. An analytical sample was prepared by recrystallization from acetone, M.P. 131–132°. IR (Nujol) 10.21 and 10.57μ (oxetane); NMR (benzene-d₆) δ 4.23 (s., 1H oxetane CH₂), 2.72 (s., 1H, C—CH₂S), 2.54 (s., 2H, SCH₂CH₂S)

*Analysis.*—Calcd. for $C_{18}H_{32}O_2S_6$ (percent): C, 45.72; H, 6.82; S, 40.69; MW, 473. Found (percent): C, 46.15; H, 6.84; S, 40.83; MW, 490 (ebul.).

A 1:1 mercuric chloride complex with the hexathiadispiro compound was prepared (N.B. A 3633–88) as follows. A solution of 0.54 g. (0.002 mol) of mercuric chloride in 10 ml. of 1,2-dimethoxyethane was mixed with a solution of 0.47 g. (0.001 mol) of 2,16-dioxa-6,9,12,19, 22,25-hexathiadispiro[3.9.3.9]hexacosane in 10 ml. of 1,2-dimethoxyethane. The mixture was evaporated to a volume of 10 ml. and allowed to stand several hours. The crystalline complex isolated by filtration weighed 0.67 g. (90%). Recrystallization from dimethoxyethane gave colorless crystals which, on heating, decomposed near 205° to an expanding foam.

*Analysis.*—Calcd. for $C_{18}H_{32}Cl_2HgO_2S_6$ (percent): C, 29.04; H, 4.33; Cl, 9.53; Hg, 26.95. Found (percent): C, 30.48; H, 4.51; Cl, 9.49.

1:1 complex of mercuric chloride with 2,9,16,22-tetraoxa-6,12,19,25-tetrathiadispiro[3.9.3.9]hexacosane A solution of 0.54 g. (0.002 mol) of mercuric chloride in 10 ml. of dimethoxyethane was mixed with a solution of 0.44 g. (0.001 mol) of the tetraoxatetrathiadispiro compound of Ex. 26 in 10 ml. of dimethoxyethane. The mixture was reduced in volume to 8 ml. and allowed to stand several hours. Filtration gave 0.66 g. (93%) of crystalline complex, M.P. 174–175°. A sample recrystallized from dimethoxyethane, M.P. 174–174.5°, was analyzed.

*Analysis.*—Calcd. for $C_{18}H_{32}Cl_2HgO_4S_4$ (percent): C, 30.35; H, 4.53; Cl, 9.96; Hg, 28.17. Found (percent): C, 30.36; H, 4.47; Cl, 9.89.

As sulfur atoms replace the oxygen atoms in the macrocyclic portion of the compounds of this invention, the ability to form complexes with heavy metals increases. When 50% or more of the macrocyclic oxygens are replaced by sulfur atoms, strong complexes are formed with the heavy metal ions $Pd^{+2}$, $Pt^{+2}$, $Au^+$, $Ag^+$, and $Hg^{+2}$, and accordingly the spiro compounds are useful in separating these precious metals from dilute solution.

As many apparently different embodiments of this invention may be made without departing from the spirit and scope thereof, it is to be understood that this invention is not limited to the specific embodiments thereof except as defined in the appended claims.

I claim:
1. A compound having the formula

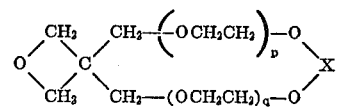

wherein X is —CH₂—CH₂— or

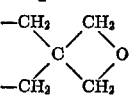

and when X is —CH₂CH₂—, $p+q$ is 2 to 9; and when X is

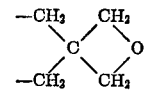

$p=q=1$ to 9.

2. A compound of claim 1 wherein X is

—CH₂—CH₂—.

3. The compound of claim 2 wherein $p+q=2$.
4. The compound of claim 2 wherein $p+q=3$.
5. The compound of claim 2 where $p+q=4$.
6. A compound of claim 1 wherein X is
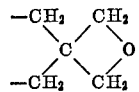
7. The compound of claim 6 wherein $p=q=2$.
8. The compound of claim 6 where $p=q=3$.
No references cited.
NORMA S. MILESTONE, Primary Examiner
U.S. Cl. X.R.
260—79, 2 XA, 2 M, 327 R